Figure 1:
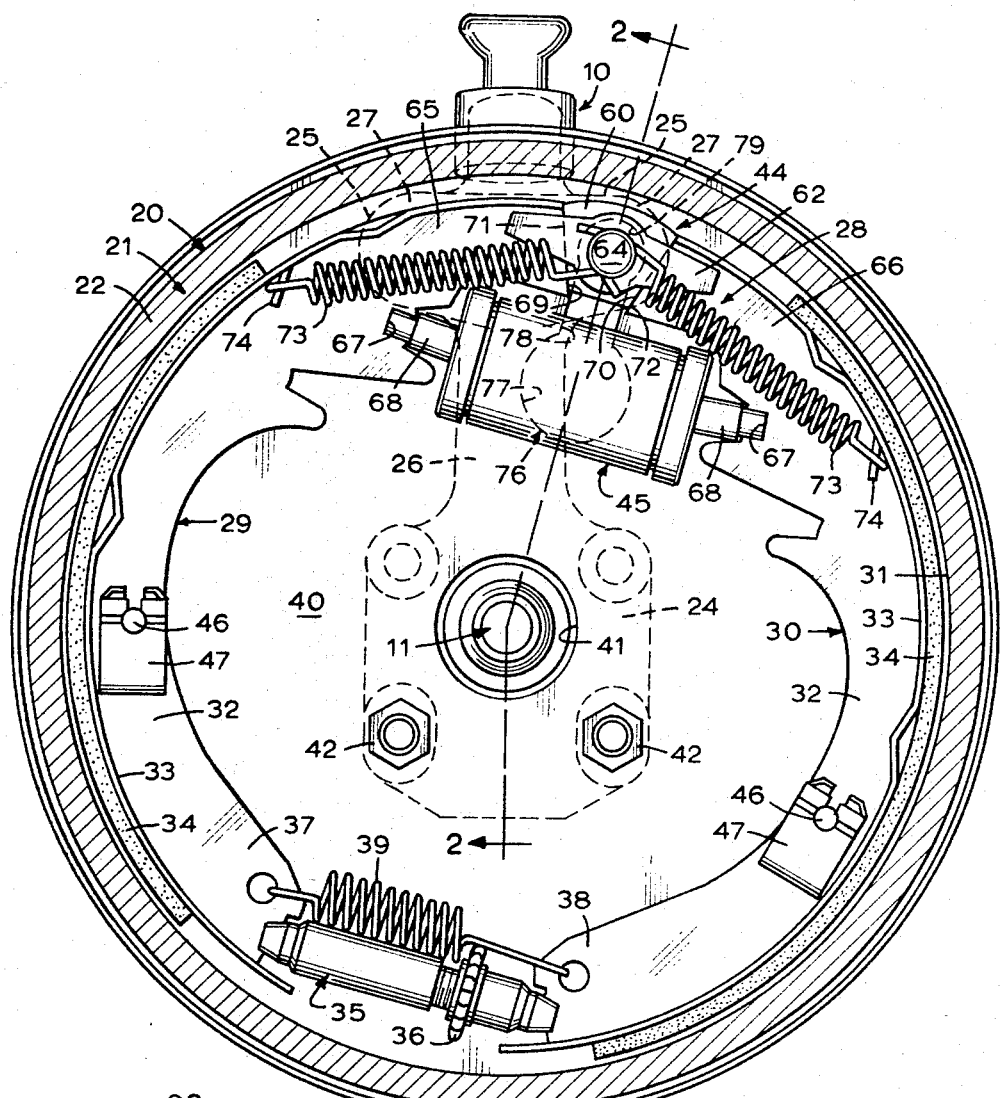

Oct. 18, 1966

J. T. PARKS 3,279,570

FRICTION DEVICE

Filed Aug. 13, 1964

2 Sheets-Sheet 1

INVENTOR
JERRY T. PARKS
BY
*Gravely, Lieder & Woodruff*
ATTORNEYS

Oct. 18, 1966

J. T. PARKS 3,279,570

FRICTION DEVICE

Filed Aug. 13, 1964

2 Sheets-Sheet 2

INVENTOR
JERRY T. PARKS
BY Gravely, Lieder & Woodruff
ATTORNEYS

# United States Patent Office 3,279,570
Patented Oct. 18, 1966

3,279,570
FRICTION DEVICE
Jerry T. Parks, St. Charles, Mo., assignor to Wagner Electric Corporation, St. Louis, Mo., a corporation of Delaware
Filed Aug. 13, 1964, Ser. No. 389,313
12 Claims. (Cl. 188—206)

This invention relates generally to the friction device art and more particularly to the mounting structure for the brake assembly of a vehicle.

In conventional shoe brake structures, both the wheel cylinder and anchor pin are fastened to the backing plate which in turn is rigidly secured to the steering knuckle at the spindle location thereof whereby the brake torque is transmitted through the anchor pin and backing plate to the steering knuckle. It has been proposed that the anchor pin may be fastened rigidly to an embossment of the steering knuckle to provide for transmitting the brake torque directly through the anchor pin to the steering knuckle.

One of the critical problems of brake shoe assembly design is maintaining the concentricity of pivoted brake shoes with the brake drum during non-braking periods to assure that there is no brake shoe drag and resulting wear and an important aspect of the problem is the close tolerance required in the radial dimension between the spindle and anchor pin center lines. One proposal to obviate this aspect of the problem has been to adjust the anchor pin on the backing plate by use of cam means or the like, but this solution has not proved to be satisfactory. Another problem encountered in the prior art is the assembly of the brake shoes, wheel cylinder and other associated parts on or with the backing plate in such condition that these parts may readily be stored, shipped and installed as original equipment or replacement parts in the brake structure of a motor vehicle or the like. The prior art constructions and arrangements of parts of the wheel brake units have generally required on the spot assembly of the brake shoes with the wheel cylinder and backing plate.

The principal object of the present invention is to provide an improved knuckle mounted brake assembly obviating the problems of the prior art.

Another object is to provide a simplified brake assembly in which the brake shoes are self-centering with respect to the brake drum and the brake torque is transmitted directly to the steering knuckle.

Another object is to provide a knuckle-mounted brake assembly obviating the need for a heavy or rigidly mounted backing plate.

A further object of the invention is to provide a brake sub-assembly which can be assembled, shipped and installed as a unit thereby greatly facilitating replacement and service of vehicle brakes.

These and still other objects and advantages will become more apparent hereinafter.

Briefly, the invention comprises a brake assembly mounting including a supporting member, an anchor pin secured to the supporting member and seating opposed ends of brake shoes, means for securing a wheel cylinder in spaced relation with the anchor pin, and resilient means for seating a backing plate in assembled circumscribing relation with the anchor pin.

Figure 3:
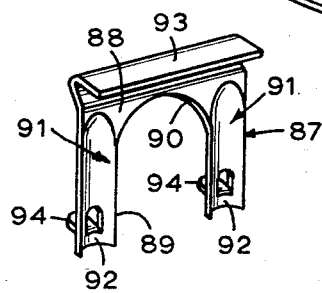
Figure 2:
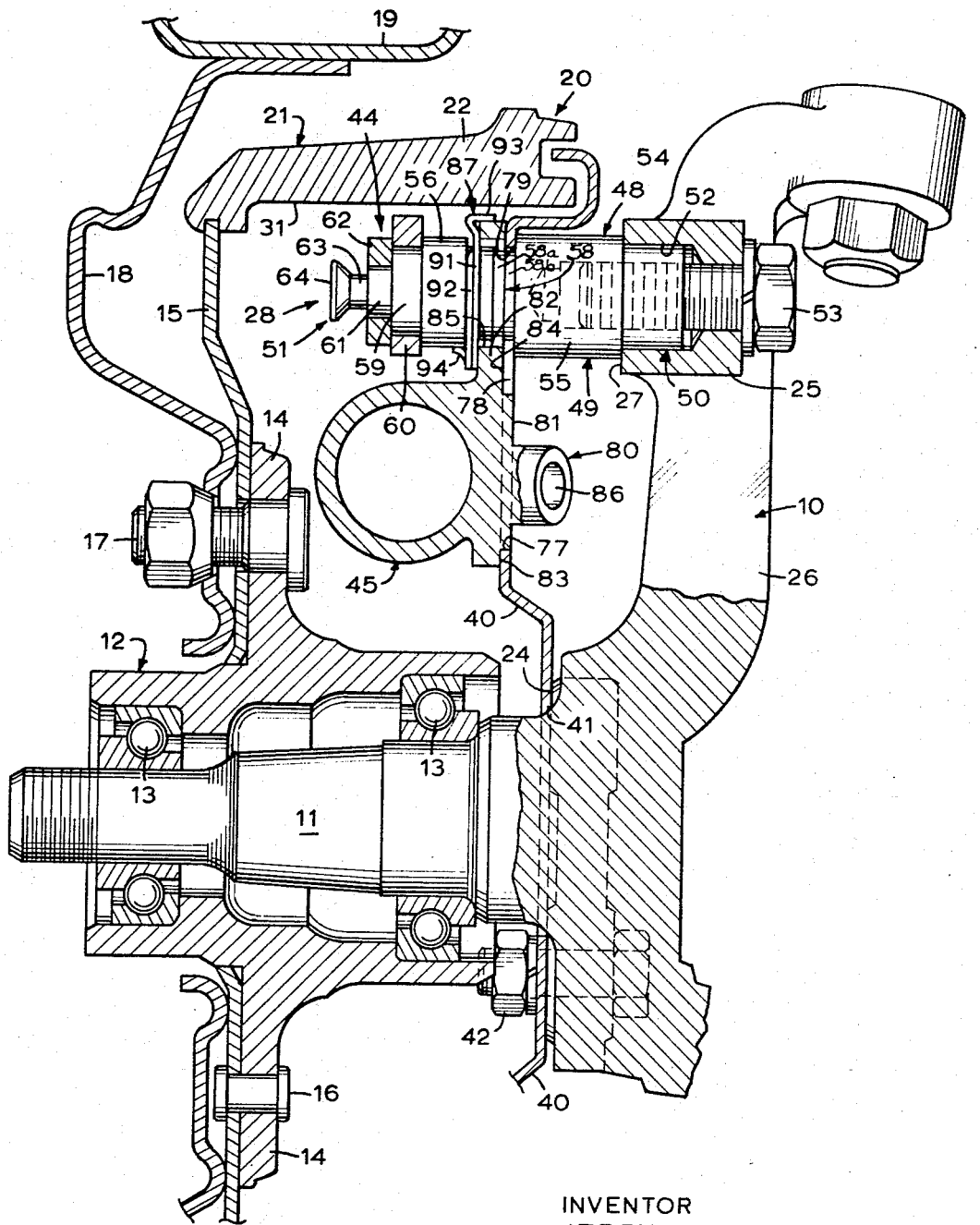

The invention is also embodied in the parts and in the combinations and arrangements of parts hereinafter described and claimed. In the accompanying drawings which form a part of this specification and wherein like numerals refer to like parts wherever they occur:

FIGURE 1 is a vertical elevational view of a brake assembly embodying the invention, the brake drum being shown in cross-section, FIGURE 2 is a cross-sectional view taken substantially along line 2—2 of FIGURE 1, and FIGURE 3 is an enlarged perspective view of a resilient clip used in the invention.

Referring now to the drawings, the conventional steering mechanism of a motor vehicle includes a steering knuckle 10 forming a structural support member carrying an axle spindle 11 projecting horizontally therefrom and rotatably carrying a wheel hub 12 on suitable bearings 13. The wheel hub 12 has a radial hub flange 14 to which a brake drum disk 15 is secured by means of rivets 16 or the like. Wheel lugs 17 are also provided on the hub flange 14 to support the wheel disk 18 that carries the wheel rim 19 and the tire (not shown). The friction device 20 includes the brake drum 21 comprising an annular drum ring 22 secured to the outer periphery of the drum disk 15 and, in turn, to the wheel hub 12 for rotation relative to the spindle 11 and the steering knuckle 10.

The steering knuckle 10 is provided with a spindle pad surface 24 disposed about the spindle 11 and, in accordance with the present invention, enlarged pads or embossments 25 are formed on each side of the knuckle shank 26 above the spindle 11 and are provided with knuckle pad surfaces 27.

The friction device 20 also includes a friction device or wheel brake subassembly 28 including a pair of friction members or arcuate brake shoes 29 and 30 positioned within the brake drum 21 and adapted for frictional braking engagement with the inner drum surface 31. Each of the brake shoes 29 and 30 has a web 32 and a table 33 to which a friction lining 34 is secured. An adjustable strut 35 including a star wheel 36 articulates the lower opposed adjacent ends 37 and 38 of the brake shoes 29 and 30, and a coiled spring 39 is connected between the lower ends 37 and 38 of the shoes to maintain contact between the shoes and the adjustable strut and to prevent undesired rotation of the star wheel 36. The wheel brake subassemly 28 includes a support member or backing plate 40 having a central opening 41 through which the spindle 11 extends, the backing plate 40 being secured to the spindle pad surface 24 of the steering knuckle 10 by bolts 42 in concentric position with the brake drum 21. The brake shoes 29 and 30 are carried and supported primarily by another support member or anchor pin assembly 44, are actuated by a wheel cylinder 45, and are stabilized and retained in position in the wheel brake subassembly 28 by guide pins 46 and resilient clips 47 adjustably holding the brake shoes 29 and 30 on the backing plate 40.

The anchor pin assembly 44 includes an anchor pin 48, which is generally cylindrical in shape, and has a large central or body portion 49, a smaller rear mounting portion or shank 50 and a smaller stepped front portion 51. It will be noted in FIGURE 1 that the wheel brake assembly 28 is rotated approximately 15° from the vertical so that the anchor pin assembly attachment to the steering knuckle 10 will not interfere with the main portion of the knuckle shank 26. The rear portion 50 of the anchor pin is received with a snug fit into a bore 52 in the embossment 25 of the steering knuckle 10, and is secured therein by a suitable bolt 53, an annular abutment surface 54 between the central and rear portions 49 and 50 being engaged against the knuckle pad surface 27. The central portion 49 has a large diameter rear section 55 and a smaller diameter front section 56 with an annular stepped groove 58 being formed in the central portion 49 of the anchor pin 48 between the rear and front sections 55 and 56 to receive and retain the backing plate 40 and wheel cylinder 45 as will be described more fully hereinafter. The front portion 51 of the anchor pin 48 includes a first reduced cylindrical section 59 adjacent to the central portion for rotatably carrying an anchor block member 60 forming a part of the anchor pin assembly. The front stepped portion 51 also includes a further reduced section 61 on which is mounted a shoe guide 62. Extending outwardly beyond the second reduced section 61 is a neck 63 and beveled head 64.

As above stated, the brake shoes 29 and 30 are supported primarily by the anchor pin assembly 44 and are actuated by the wheel cylinder 45. The upper opposed adjacent ends 65 and 66 of the shoes 29 and 30 include notches 67 formed in the webs 32 to receive slotted ends of push rods 68 adapted to be actuated by pistons (not shown) of the wheel cylinder 45. The ends of the shoes are also provided with flat inclined abutment surfaces 69 and 70 in slidable contact with opposed surfaces 71 and 72 of the anchor block member 60, and are normally retained in retracted position thereagainst by return springs 73 connected between the neck 63 of the anchor pin 48 and hooks 74 formed on the tables 33 of the brake shoes 29 and 30. Referring particularly to FIGURES 2 and 3, it will be seen that the backing plate 40 includes a keyhole shaped opening 76 having an enlarged circular lower portion 77 and a narrower radially extending slot portion 78 forming into a small circular upper portion 79. The wheel cylinder has a rear mounting portion 80 including a substantially circular embossment 81 offset from the main wheel cylinder body to form an adjacent surface 83 for abutment with the backing plate 40. A flange 82 is formed integral with the main body of the wheel cylinder 45, the rear surface 84 thereof being coterminous with the surface 83. The flange 82 extends upwardly and has a large opening 85 sized to be received over the front section 56 of the central anchor pin portion 49 for mounting the wheel cylinder 45. The wheel cylinder also has the usual brake line connections 86 and the like.

A resilient or spring clip 87 is provided for retaining the wheel cylinder 45 on the backing plate 40 in fixed radially spaced relationship with the anchor pin assembly 44 and for mounting the backing plate and wheel cylinder in axial position relative to the anchor pin 48. The clip member 87 includes a main body portion 88 having an elongated slot 89 formed upwardly from its lower margin. The slot 89 has a rounded upper edge 90 complementary to the anchor pin at the annular groove 58, and spaced tines or fingers 91 are formed between the slot 89 and the side margins of the clip member 87. Each tine 91 is provided with an arcuate depression or groove 92 extending into the body section 88 whereby the tines are formed as resilient spring members. The upper portion of the body section 88 is provided with a re-entrant bend 93 for assembly and removal of the clip member 87. Tabs 94 are struck from the spring members 91 for engagement with the anchor pin 48.

The anchor pin 48 is assembled with the backing plate 40 by being inserted into the circular lower portion 77 of the opening 76 with the small annular step 58a of the annular groove 58 in registry with the backing plate 40, and the anchor pin 48 is moved upwardly with the small step 58a being received into the slot portion 78 to a point where the large annular step 58b is aligned with the upper portion 79 of the annular groove 58. The anchor pin 48 is then moved axially to fit the large step 58b into the upper opening portion 79 to thereby retain the anchor pin against vertical displacement and the sections 55 and 56 of the central portion 49 of the anchor pin preventing axial displacement of the pin from the backing plate 40. The wheel cylinder 45 is assembled with the anchor pin by placing the anchor pin in the flange opening 85 and moving it over the pin section 56 and against the backing plate 40 with the embossment 81 being piloted into the circular lower portion 77 of the keyhole opening 76 and the flange surface 84 and abutment 83 in contact with the backing plate 40. The spring clip 87 is positioned with the bifurcated spring members 91 between the mounting flange 82 of the wheel cylinder and the anchor pin shoulder formed between the section 56 and the groove 58, and is pressed downwardly to yieldably mount the backing plate 40 and wheel cylinder together on the anchor pin 48. The tabs 94 are positioned to snap under the section 56 and prevent displacement of the clip 87 from the anchor pin 48.

It will thus be seen that the anchor pin assembly 44 and wheel cylinder 45 are mounted in fixed radially spaced relation by the wheel cylinder flange 82 and their retention in the opening 76 of the backing plate 40, which is retained in abutment with the wheel cylinder surfaces 83 and 84 and is also positioned in the anchor pin groove 58 against the section 55 of the central portion 49. The ends 37 and 38 of the brake shoes 29 and 30 are jointed by the adjustment strut 35 and spring 39, and the shoes are assembled with the wheel cylinder push rods 68 in the notches 67 and the end surfaces 69 and 70 slidably received on the anchor block 60 and are held in assembled position by the return springs 73. The shoes 29 and 30 are also adjustably positioned on the backing plate 40 by the clips 47 to complete the wheel brake subassembly 20.

The subassembly 20 facilitates factory assembly, storage and shipment and, in addition, can be readily installed on the steering knuckle 10 as a unit by fitting the shank 50 of the anchor pin 48 directly or non-rotatively into the opening 52 and securing the bolt 53 from the opposite side of the knuckle pad 25. The bolts 42 are also applied to align and support the backing plate 40 on the spindle pad 24.

According to the invention, all braking forces are transmitted from the shoes 29 and 30 through the anchor pin assembly 44 directly to the steering knuckle 10, and although the wheel cylinder 45 does not receive any of the torque of braking, its fixed spaced position relative to the anchor pin assembly 44 is important in the actuation and retraction of the brake shoes 29 and 30. In the subassembly 20 the backing plate 40 functions as a dust shield, as a stabilizer for restraining brake shoe displacement from the subassembly 20 during shipment and installation and as a cooperable part in securing and spacing the wheel cylinder 45 and anchor pin 48 in assembled relationship.

It will be understood that the sliding engagement of the brake shoe surfaces 69 and 70 with the anchor block member 60 and the yieldable brake shoe connection means, which includes the adjustable strut 35 and spring 39 articulating the lower ends 37 and 38, the resilient clips 47 and the retraction springs 73, together provide a fully floating brake shoe condition permitting the brake shoes 29 and 30 to adjust themselves concentrically with the brake drum 21. It will also be understood that the spring clip member 87 retains the wheel cyclinder 45 and backing plate 40 together and is yieldable to urge these parts into abutment with the anchor pin 48.

The invention is intended to include all changes and modifications of the embodiment selected for disclosure that will be readily apparent to those skilled in the art, and the invention is limited only by the scope of the claims which follow.

The embodiments of the invention in which an exclusive property or privilege is claimed are defined as follows:

1. In a knuckle mounted brake subassembly having a backing plate, opposed brake shoe means with torque transmitting ends, actuating means for said brake shoe means, and anchor pin means for engagement by said torque transmitting ends of said brake shoe means; the combination of an opening in said backing plate having radially aligned and interconnecting large and small portions, said anchor pin means having a large central portion sized to be received through said large opening portion and an annular groove in said central portion sized to be received into said small opening portion with said central portion preventing axial displacement of said anchor pin means from said small opening portion, said actuating means including a flange having an opening sized to be received on said large central portion of said anchor pin means on one side of said annular groove and positioned in abutment with said backing plate, and resilient clip means for maintaining said actuating means flange and backing plate in abutment with each other and with said anchor pin means.

2. In a friction device having a backing plate, opposed brake shoe means with torque transmitting ends, actuating means for said brake shoe means, and anchor pin means for engagement by said torque transmitting ends of said brake shoe means; the combination of radially aligned and interconnecting large and small openings in said backing plate, said anchor pin means having a portion including first and second sections sized to be received through said large opening and being spaced axially by groove means sized to be received into said small opening in engagement with said backing plate to prevent radial displacement of said anchor pin means therefrom toward said large opening and with said first and second sections of said portion preventing axial displacement of said anchor pin means from said small opening, said actuating means having a mounting portion sized to be received in said large opening and flange means with another opening therethrough sized to be received over said portion, and resilient means for urging said flange means and backing plate toward abutment with each other and with one of said first and second sections of said anchor pin means.

3. In a knuckle mounted brake sub-assembly having a backing plate, opposed brake shoe means with torque transmitting ends, actuating means for said brake shoe means, and anchor pin means for engagement by said torque transmitting ends of said brake shoe means; the combination of an opening in said backing plate having radially aligned and interconnecting large and small portions, said anchor pin means having a large central portion sized to be received through said large opening portion and a stepped annular groove in said central portion received in said small opening portion and laterally moved and engaged therein to prevent vertical displacement of said anchor pin means from said backing plate with said central portion preventing axial displacement of said anchor pin means from said backing plate, said actuating means including a flange having an opening sized to be received on said large central portion of said anchor pin means on one side of said annular groove and positioned in abutment with said backing plate, and resilient clip means for maintaining said actuating means flange and backing plate in abutment with each other and with said anchor pin means.

4. A friction device comprising a support means, friction means movably supported on said support means, actuating means on said support means for said friction means, anchor means for said friction means, aperture means in said support means, groove means in said anchor means sized to be received in said aperture means and preventing axial displacement of said anchor means therefrom, and means for maintaining said anchor means in axial displacement preventing engagement with said support means.

5. A friction device comprising a backing plate having interconnecting large and small openings therethrough, friction means movably supported on said backing plate, anchor pin means for said friction means having a portion sized to be received through said large opening, and groove means in said portion sized to be received into said small opening with said portion preventing axial displacement of said anchor pin means from said small opening, actuating means for said friction means including flange means having another opening therethrough sized to be received on said portion of said anchor pin means, and other means for urging said flange means and backing plate toward abutment with each other and with said anchor pin means.

6. The friction device according to claim 5, comprising other flange means on said actuating means sized to be received into said large opening.

7. The wheel brake mechanism according to claim 5 in which said other means comprises a spring clip having a body portion with depending spring legs to be received over said anchor pin means and engaged between a radial shoulder thereof and said flange means for biasing said flange means and actuating means against said backing plate.

8. A friction device adapted for mounting on a pair of friction device mounting means of a vehicle structural member comprising a pair of support means for respective assembly into fixed engagement with said mounting means, said support means being relatively immovable with respect to each other when fixedly engaged with said mounting means, aperture means in one of said support means, the other of said support means being sized to be received into said aperture means including a portion for displacement preventing engagement with said one support means adjacent to said aperture means and resilient means urging said portion toward displacement preventing engagement with said one support member and providing a predetermined amount of relative movement between said supporting means during their respective assembly into fixed engagement with said mounting means.

9. In a friction device comprising a pair of support members, a pair of interconnected aperture means in one of said support members, the other of said support members being sized to be received through one of said aperture means for movement into the other of said aperture means including means sized to be received into said other aperture means in engagement with said one support member to prevent displacement of said other support member toward said one aperture means, and other means for maintaining said support members in displacement preventing engagement.

10. In a friction device comprising a pair of radially and axially displaceable support members, a pair of interconnected apertures in one of said support members, the other of said support members being axially receivable through one of said apertures for radial movement toward the other of said apertures including means receivable into said other aperture for radial displacement preventing engagement with said one support member, and other means for axial displacement preventing engagement with said one support member when said first named means is received in said other aperture, and means engaged between said support members for maintaining said first named and other means in radial and axial displacement preventing engagement with said one support member.

11. In the friction device according to claim 10, comprising slot means in said one support member and connected between said aperture means, said one groove means being movable through said slot means into said other aperture means, said other aperture means also defining other abutment means adjacent to the juncture thereof with said slot means for displacement preventing engagement with said other groove means when said other groove means is received in said other aperture means.

12. In a friction device comprising a pair of support members, a pair of interconnected aperture means in one of said support members, the other of said support members having a portion thereon receivable through one of said aperture means and including a pair of stepped groove means, one of said groove means being sized for movement into the other of said aperture means, the other of said groove means being sized to be received into said other aperture means in engagement with said one support member to prevent displacement of said other support member toward said one aperture means, and abutment means for displacement preventing engagement with said one support member when said other groove means is received in said other aperture means, and means for maintaining said other groove means and abutment means in displacement preventing engagement with said one support member.

References Cited by the Examiner

UNITED STATES PATENTS

| | | | |
|---|---|---|---|
| 2,372,415 | 3/1945 | Eksergian | 188—152 |
| 2,885,035 | 5/1959 | Rubly | 188—206 |
| 2,902,118 | 9/1959 | Parker | 188—78 |

FOREIGN PATENTS 149,903  2/1953  Australia.

DUANE A. REGER, *Primary Examiner.*